United States Patent [19]
Keller et al.

[11] Patent Number: 5,165,048
[45] Date of Patent: Nov. 17, 1992

[54] FLASHLIGHT BATTERY RECHARGER SYSTEM

[75] Inventors: Donald A. Keller, Irving; W. Clay Reeves, Dallas; Michael Story, Arlington, all of Tex.

[73] Assignee: The Brinkman Corporation, Dallas, Tex.

[21] Appl. No.: 612,685

[22] Filed: Nov. 13, 1990

[51] Int. Cl.⁵ ............................ H02J 7/00; F21L 7/00
[52] U.S. Cl. ........................................ 320/2; 362/183
[58] Field of Search ............................ 320/2; 362/183

[56] References Cited

U.S. PATENT DOCUMENTS

| | | | |
|---|---|---|---|
| 4,092,580 | 5/1978 | Prinsze | 320/2 |
| 4,605,993 | 8/1986 | Zelina | 362/183 |
| 4,829,226 | 5/1989 | Nakamura et al. | 320/2 |
| 4,835,410 | 5/1989 | Bhagwat et al. | 320/2 |
| 5,008,785 | 4/1991 | Maglica et al. | 320/2 |

*Primary Examiner*—Steven L. Stephan
*Assistant Examiner*—Thomas M. Dougherty
*Attorney, Agent, or Firm*—Pretty, Schroeder, Brueggemann & Clark

[57] ABSTRACT

A battery recharger that can be used with a standard flashlight having a flared head and a generally cylindrical body includes a recharger unit that accepts flashlight batteries for recharging and a clamping structure that grasps the flashlight where the flashlight head joins the flashlight body and exerts enough clamping force to support the weight of the recharger unit when it contains the batteries. Substantially all of the flashlight body is free to be used as a carrying handle and also to be used as a lever arm to remove the flashlight from the grip of the clamping structure. The recharger includes recharging circuitry that can fully charge high-performance battery sticks up to their rated power of 4.4 amp-hours. The recharger accepts both two-cell and three-cell size battery sticks, and can be moved about to whatever locations are necessary.

15 Claims, 5 Drawing Sheets

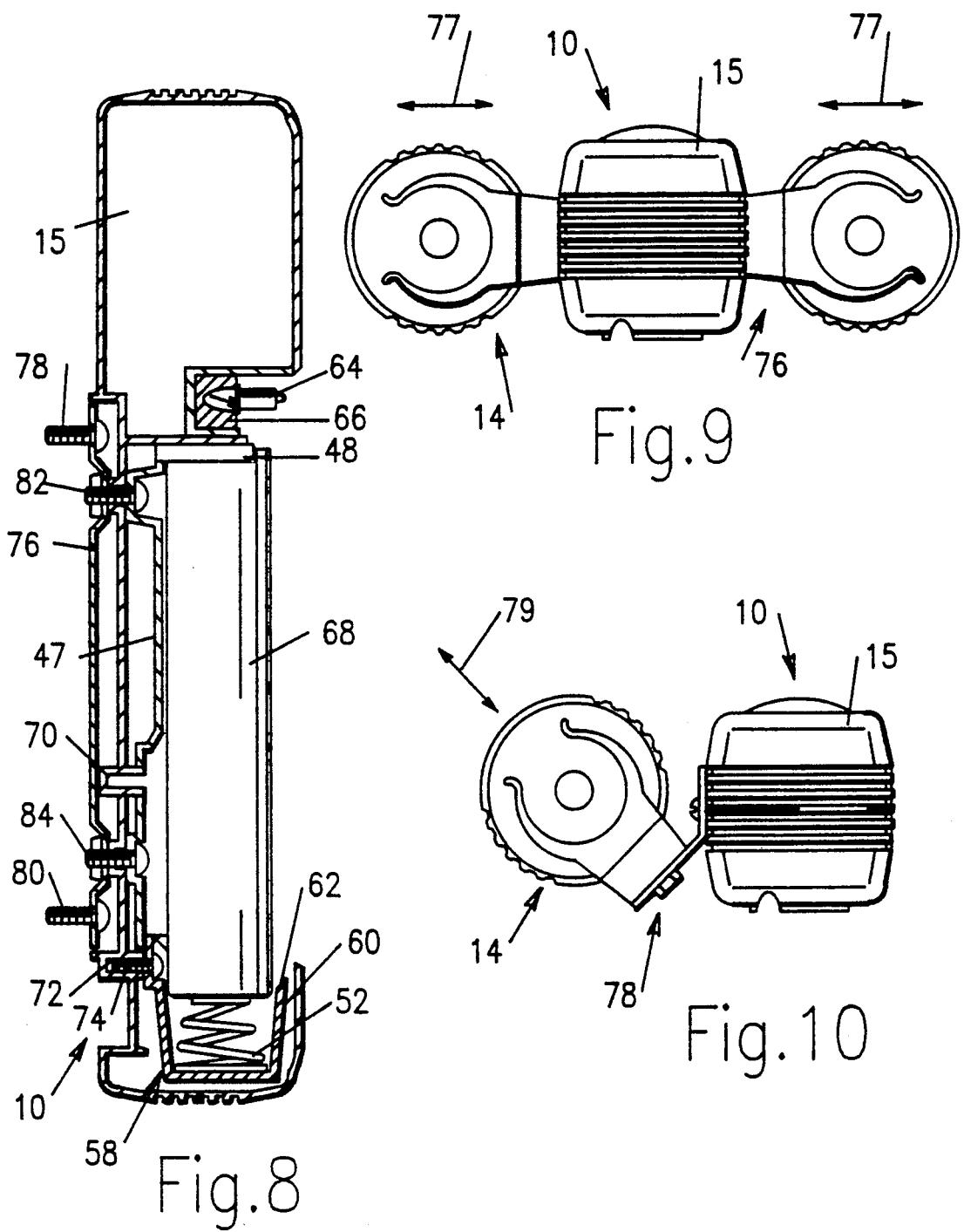

FLASHLIGHT BATTERY RECHARGER SYSTEM

BACKGROUND OF THE INVENTION

1. Field of the Invention

This invention relates generally to battery recharger systems and, more particularly, to flashlight battery rechargers that can be used for recharging standard-size batteries for flashlights.

2. Description of the Related Art

Many flashlights are equipped with rechargeable batteries and are available with matching battery recharger units. The flashlight batteries can be recharged rather than disposed of when their energy has been depleted, thus reducing expenditures for batteries. Usually, the recharger is uniquely adapted to accept a particular flashlight and to make the necessary electrical connections with the flashlight to recharge the batteries while they are still in the flashlight. Also, if the flashlight is infrequently used, it can be stored with its batteries kept at full charge. The user simply plugs the flashlight into the recharger between uses.

Recharging the batteries in the flashlight by plugging into the recharger makes the recharger simple to use and provides a storage unit to keep the flashlight in a convenient place. Unfortunately, because many recharger systems are specifically designed for a particular flashlight, they are not compatible with non-rechargeable flashlights or with rechargeable flashlights designed for other systems. This decreases the range of applications for which such recharger systems can be used.

For proper recharging of such systems, the flashlight and recharger must mate together in a secure electrical connection. Therefore, most conventional recharger units must be securely attached to a mounting surface so the electrical connection can be made when the flashlight is attached and detached. The need for a secure mounting reduces the mobility of the flashlight because the recharger cannot be easily transported. For example, the recharger unit is frequently mounted to a wall or to a secure bracket in a car or truck. If the flashlight is needed at a different location, the recharger unit must be left behind or an additional recharger unit must be obtained. The flashlight can run out of charge while it is being used at the different location if no other recharger is available. In addition, once the flashlight batteries run out of charges, the flashlight must be plugged back into the recharger and cannot be used.

Further decreasing the range of applications suitable for conventional rechargers is the fact that many such rechargers do not include much of the recharging circuitry, and instead the flashlights themselves house a good portion of the recharger electronics. Because the flashlight is apt to receive some physical abuse, such as by being dropped and hit, the recharger electronics contained inside can be damaged. Warranty and general repair work on such flashlights often involves the recharger electronics. Therefore, many recharger systems are not suitable for use under severe conditions, such as military or police work.

Finally, many high performance flashlights having a standard flared head and cylindrical body design, such as those used by the military, the police, and emergency rescue personnel, use what are commonly referred to as battery sticks. Battery sticks typically comprise several battery cells, are the size of two or three standard D-cell batteries joined together, and often are covered with a protective plastic wrap. Such battery sticks frequently have a rating of approximately 4.4 amp-hours, whereas standard consumer batteries might have a rating of 0.9 to 1.0 amp-hours. Recharger units for conventional rechargeable batteries are designed to recharge to the 0.9 to 1.0 amp-hour level. Thus, typical flashlight-recharger systems and battery rechargers generally would be incapable of adequately recharging battery sticks. Also, most recharger units for rechargeable flashlights will not work with standard cylindrical body flashlights. As mentioned above, they are designed to mate with particular flashlight bodies and require an electrical connection.

From the discussion above, it should be apparent that there is a need for a flashlight battery recharger unit that is mobile, can fully recharge battery sticks, and that is compatible with high performance flashlights from a wide range of manufacturers. The present invention satisfies this need.

SUMMARY OF THE INVENTION

Briefly, and in general terms, the present invention provides a battery recharger unit that fully recharges high performance battery sticks outside of the flashlight and that securely holds onto a standard cylindrical body flashlight with a removable clamping structure. No electrical connection between the flashlight and recharger is necessary. Preferably, the clamping structure holds onto the flashlight with enough force to allow the flashlight body to be used as a carrying handle for the recharger, but also allows the flashlight to be easily removed. The recharger unit holds onto the top portion of a standard cylindrical body flashlight, leaving enough of the flashlight body free to both serve as a handle and act as a lever arm to pull the body out of holding engagement with the recharger. Thus, the recharger unit can be used with flashlights from a variety of manufacturers and can be easily carried to convenient locations. Because the clamping structure is removable and the batteries are not recharged while in the flashlight, the clamping structure can be mounted in a location different from the recharger, placing each in the most convenient location. Preferably, the recharger unit accepts battery sticks in two-cell and three-cell sizes and recharges them to their full 4.4 amp-hour rated capacity and can be connected to a variety of electrical power sources, including 12 volts dc, 110 volts ac, and 220 volts ac.

In a presently preferred embodiment, the clamping structure comprises a circular arm that accepts the head of the flashlight and semi-circular open arms that snap around the body of the flashlight to hold a standard high performance flashlight having a flared head and a cylindrical body. When the flashlight is being attached, the circular arm allows the head and body of the flashlight to pivot relative to the recharger unit until the body is received by the semi-circular arms. The semi-circular arms exert a clamping force around the flashlight's body that is sufficient to support the weight of the recharger unit when it is filled with batteries and together with the circular arm hold the flashlight body parallel and spaced away from the recharger unit. This allows the flashlight body to be grasped and used as a carrying handle.

In the preferred embodiment, the semi-circular open arms clamp around the flashlight's body at a location just below its head, leaving most of the body free to be used as a carrying handle and as a lever arm to pry the body out of the grasp of the semi-circular arms. Thus, the flashlight is securely held by the recharger unit, but can also be easily removed when the flashlight must be used. Because the clamping structure can be removed from the rest of the recharger unit and attached to a separate mounting surface, the mobility of the system is increased and the flashlight can be held by the clamping structure at a convenient location.

The preferred embodiment of the recharger unit includes a battery tray that receives battery sticks in both two-cell and three-cell sizes for recharging. The battery sticks can be placed in the battery tray by opening an access door of the recharger unit. The door preferably closes with a snap force great enough that batteries in the battery tray will not fall out of the recharger if they are not securely held in the tray. The recharger also includes a storage area where two replacement flashlight bulbs can be stored. The recharger unit can accommodate both two-cell and three-cell battery sticks because the battery tray includes a movable portion that can be fixed in either a two-cell position or in a three-cell position.

An indicator on the recharger unit provides an indication of when the batteries are still being recharged and when the batteries have reached full charge. This conveniently informs the user as to when the batteries in the recharger are ready for use, and is especially useful in multiple recharger systems where many batteries might be recharging and only fully charged batteries should be selected for use. Also, the recharger unit can be easily modified to include a second clamping structure that receives a second flashlight and allows both flashlights to be clamped to the recharger unit. Larger numbers of flashlights can be accommodated, for example, by providing a bank of rechargers all connected to electrical power sources.

The invention provides a flashlight battery recharger unit that accepts a wide variety of makes of standard flashlights and converts any conventional flashlight to a rechargeable flashlight when it is used with rechargeable batteries. The flashlight batteries are recharged out of the recharger unit, eliminating the need for a precise electrical connection between the recharger and the flashlight. The recharger accepts rechargeable battery sticks and will recharge them to their fully rated capacity. Either one or two flashlights can be removably mounted to a single recharger unit, allowing the flashlight to be used as a carrying handle but also allowing enough leverage to be applied through the flashlight body to pull the flashlight out of engagement with the clamping structure.

Other features and advantages of the present invention should be apparent from the following description of the preferred embodiments, taken in conjunction with the accompanying drawings, which illustrate, by way of example, the principles of the invention.

BRIEF DESCRIPTION OF THE DRAWINGS

FIG. 8 is a cross-sectional view of the battery recharger illustrated in FIG. 6 showing the three-cell configuration with a three-cell battery stick in place.

FIG. 9 is a view looking up from the bottom of a battery recharger such as illustrated in FIG. 1 with a second clamping arm in place.

FIG. 10 is a view looking up at a recharger such as shown in FIG. 1 with a clamping mechanism mounted at an angle.

DESCRIPTION OF THE PREFERRED EMBODIMENTS

Figure 1:
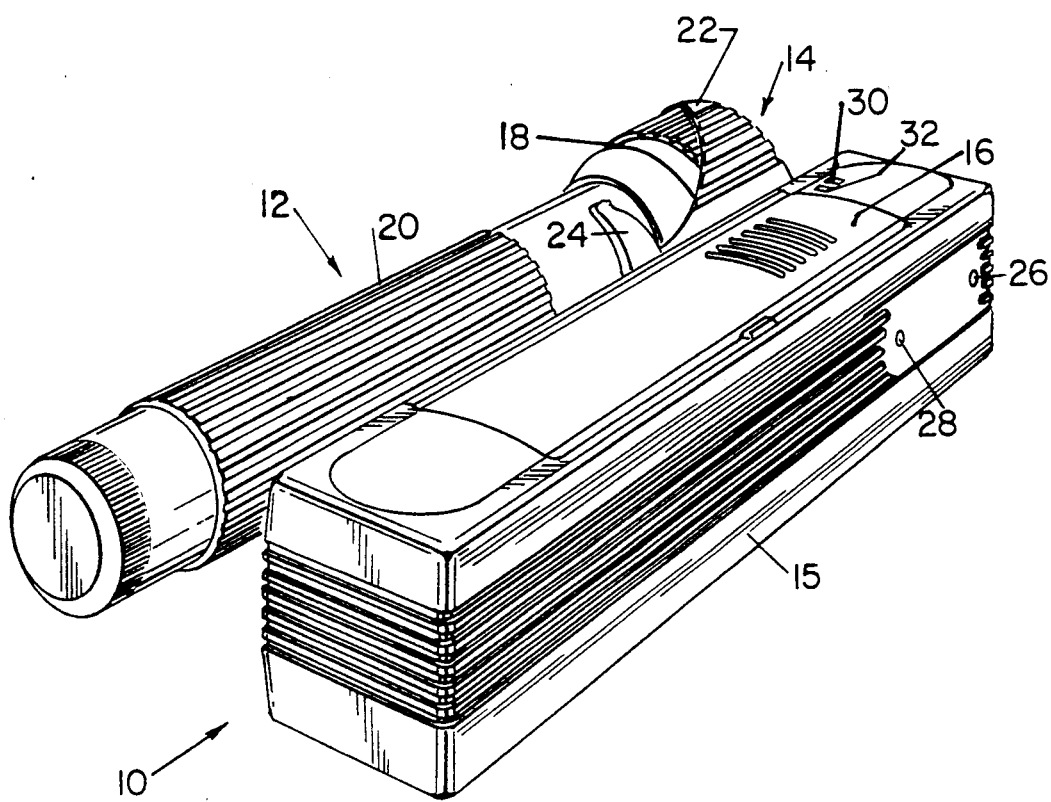
FIG. 1 is a perspective view of a battery recharger in accordance with the present invention with a standard three-cell flashlight detached.

A battery recharger system 10 in accordance with the present invention is illustrated in FIG. 1 with a standard high-performance flashlight 12 attached and includes a recharger unit 15 and a removable clamping structure 14 that holds the flashlight securely enough to support the weight of the recharger unit with batteries, and that holds the flashlight so it can be used both as a carrying handle and also as a lever arm to assist in removing the flashlight out of the grasp of the clamping structure. These dual functions are achieved because the clamping structure advantageously holds the top part of the flashlight, leaving most of the flashlight free to both serve as a handle for carrying the recharger and to act as a lever arm. The recharger unit accepts battery sticks in two-cell and three-cell sizes through an access door 16 and recharges the battery sticks to their full 4.4 amp-hour rated capacity. The flashlight 12 illustrated is of the standard high-performance type, having a flared head 18 and a cylindrical body 20 made from machined aluminum.

The clamping structure 14 includes a circular arm 22 and open semi-circular arms 24, only one of which is visible in FIG. 1. The circular arm accepts the head 18 of the flashlight 12 and allows the flashlight to pivot with respect to the recharger unit 15 so that the semi-circular open arms can grasp the body 20 of the flashlight. Two mounting holes 26 and 28 on each side of the recharger unit serve as mounting points for the clamping structure 14. Thus, two flashlights each having a battery stick can be attached to the recharger system 10, while a third battery stick is being recharged by the recharger unit itself. Alternatively, neither one of the pairs of mounting holes must have an attached clamping structure. Because the batteries are not recharged while in the flashlight, the recharger unit can be at a different location from the clamping structure, allowing each to be located at the most convenient place.

A first indicator light 30, such as a light emitting diode (LED), indicates when batteries are in the recharger unit 15 and are being charged. A second LED indicator light 32 indicates when the batteries within the recharger have been fully charged. In this way, it is possible to immediately know if the batteries in the recharger are ready for use. Without the two indicator lights, it is possible to take batteries out of the recharger only to find that they have insufficient charge. The recharger unit can include appropriate timing circuitry, for example, to provide the proper charge indication.

Figure 2:
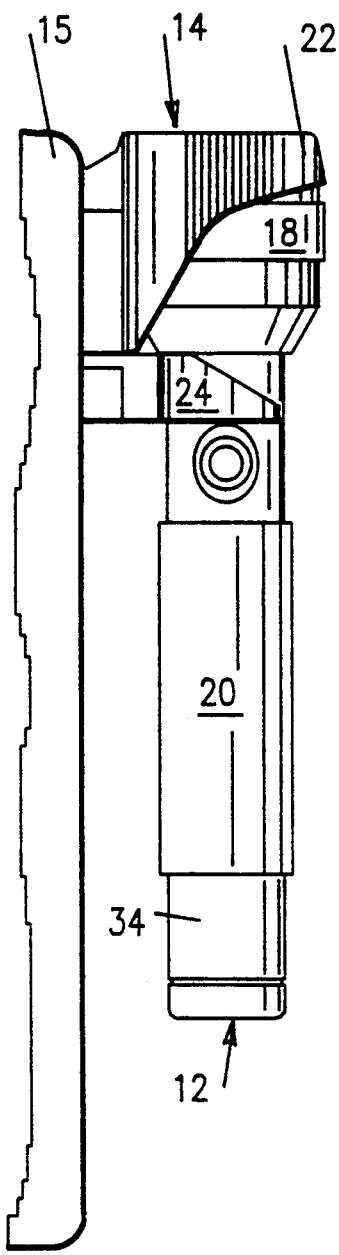
FIG. 2 is a side view of the battery recharger and flashlight shown in FIG. 1.
Figure 3:
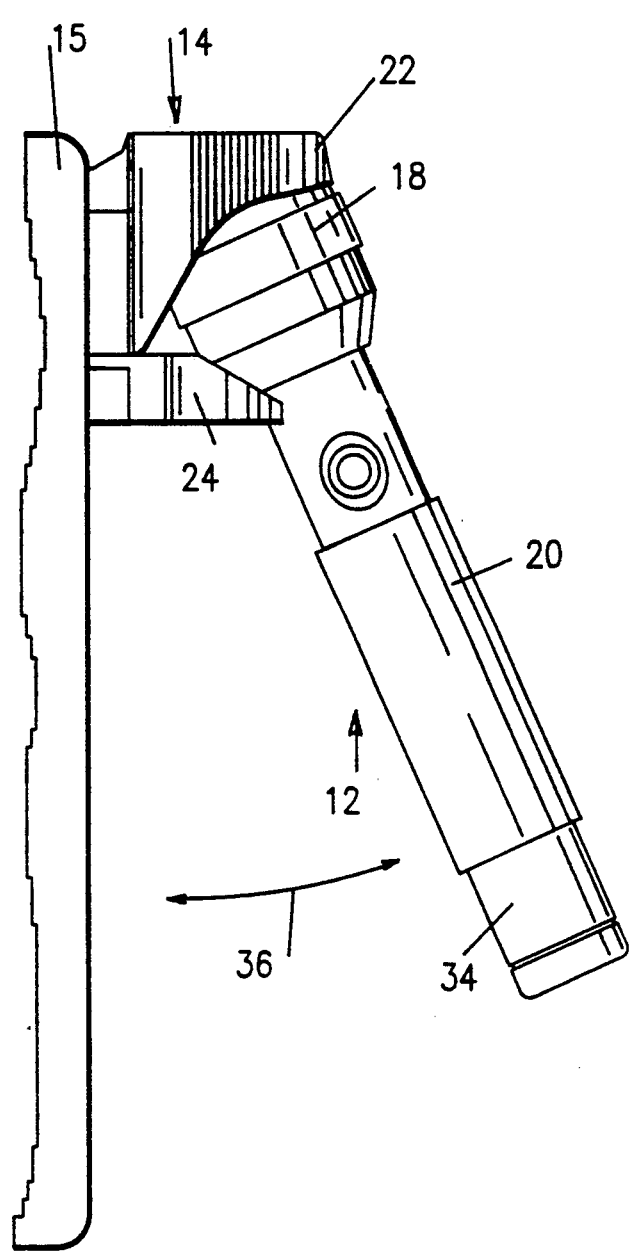
FIG. 3 is a side view of the battery recharger and flashlight shown in FIG. 1 illustrating the manner in which the flashlight can be pivoted.

The attachment and detachment of a flashlight 12 to the recharger system 10 is illustrated in FIGS. 2 and 3. When the flashlight is held attached, as shown in FIG. 2, most of the flashlight body 20 is free to be grasped and used as a carrying handle. The semi-circular open arms 24 of the clamping structure 14 hold the flashlight to the recharger unit with enough force to support at least the weight of the recharger and the batteries it may contain. The end 34 of the flashlight body farthest from the flashlight head 18 is advantageously left unattached, leaving the body and end free to be used as a lever arm in prying the flashlight away from the grip of the clamping structure. As shown in FIG. 3, when the flashlight is to be removed from the recharger's clamping structure, the body is pulled away from the recharger in the direction of the arrow 36 until the semi-circular open arms release the flashlight body, and the flashlight is pivoted out of engagement with the clamping structure.

Figure 4:
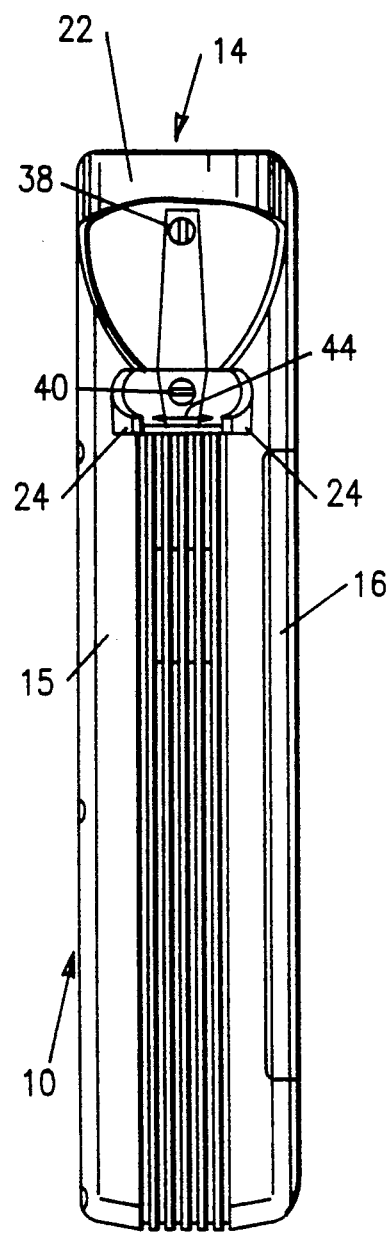
FIG. 4 is a side view of the recharger illustrated in FIG. 1 with the flashlight removed.
Figure 5:
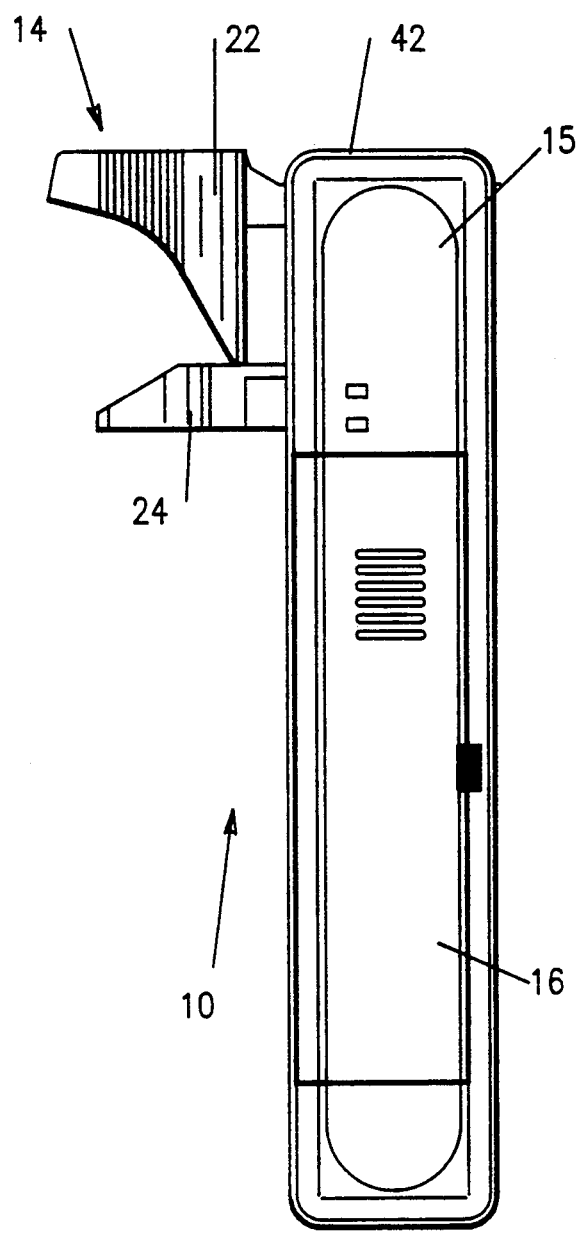
FIG. 5 is a plan view of the battery recharger shown in FIG. 4.

The recharger unit 15 itself is more clearly shown in FIGS. 4 and 5, which provide side and frontal views, respectively. The side view in FIG. 4 shows that the clamping structure 14 is attached to the recharger unit 15 by two screws 38 and 40. As noted above, the clamping structure can be completely removed from the recharger unit and mounted elsewhere, if desired. In the preferred embodiment, the clamping structure is located toward the top end 42 of the recharger unit 15 so as to best grasp the upper portion of the flashlight as described above. FIG. 4 shows the upper circular arm 22 and the lower semi-circular, open arms 24 of the clamping structure 14. The open arms receive the flashlight body 18 at their gap, which is indicated by the horizontal arrows 44. The open arms are flexible enough to spring open when the flashlight body is pushed through their gap, temporarily enlarging the gap, and then close around the body. Thus, the flashlight is easily attached and detached with a simple snap-fit action. The front view of the recharger unit 10 in FIG. 5 shows that the clamping structure 14 does not take up a great deal of space, and is easily accessed.

Figure 6:
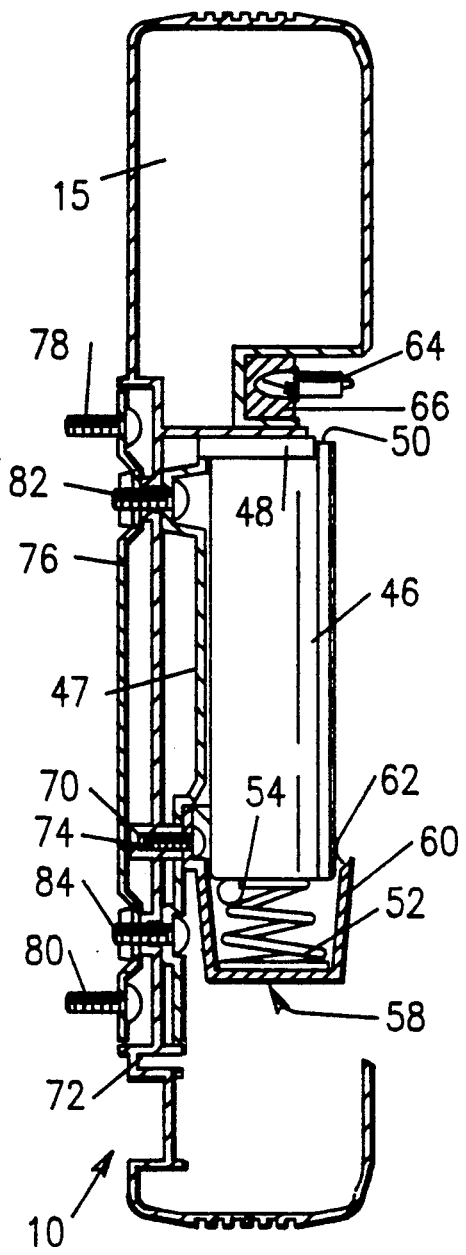
FIG. 6 is a cross-sectional view of the battery recharger shown in FIG. 4 with a two-cell battery stick in place.
Figure 7:
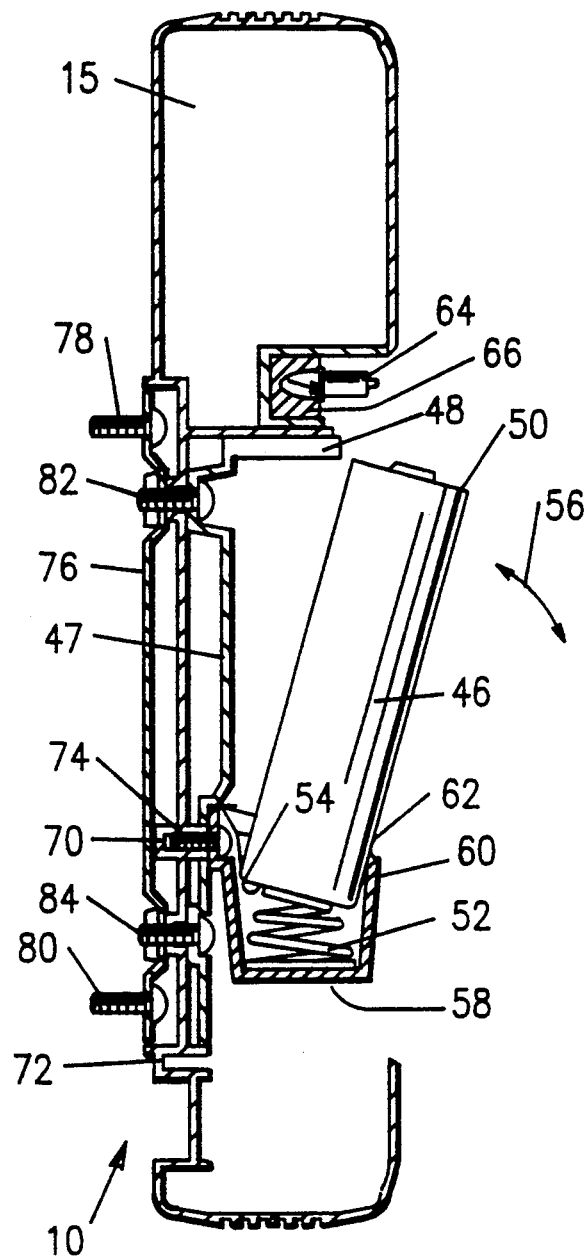
FIG. 7 is a cross-sectional view of the flashlight recharger shown in FIG. 6 illustrating the removal of the battery stick.

The internal structure of the recharger unit 10 is illustrated in FIGS. 6-8. FIG. 6 shows the recharger system with a two-cell battery stick 46 in place within the recharger unit 15, with the access door 16 removed for clarity. The battery stick comprises multiple battery cells and overall is the size of two D-cell batteries welded together, and is rated at 4.4 amp-hours. The housing contains a battery tray 47 that receives the batteries and includes both an upper contact 48 that makes an electrical connection with the positive top end 50 of the battery stick and a conducting metal coil spring 52 that makes an electrical connection with the opposite end 54 of the battery stick. The upper contact 48 and coil spring 52 are electrically connected to the recharging circuitry (not illustrated) of the recharger unit to deliver electrical energy to batteries held in the battery tray. The spring holds the battery stick in proper position under tension so that good electrical contact is maintained, and also allows the battery stick to be easily removed by being tilted outwardly, as shown by the arrows 56 in FIG. 7.

The coil spring 52 is held in proper position relative to the upper contact 48 by a spring holder or bucket 58 attached to the inside of the unit 15. The spring holder has a lowered front lip 60 when compared with its rear, and includes an angled portion 62 on the lip that allows the battery stick 46 to be pushed down to compress the spring slightly and still pivot forward away from the upper contact during removal and insertion. This is most clearly shown in FIG. 7. Spare bulbs 64 can be stored behind the access door by pressing them into a foam insert 66. While the bulbs are shown stored in a foam insert located in the unit's interior above the battery stick, it is to be understood that spare bulbs can be located in a variety of positions without departing from the teachings of the invention. For example, the bulbs could be located beneath or behind the battery stick.

The recharger unit 10 accommodates battery sticks in both two-cell and three-cell sizes, as shown most clearly in FIGS. 6 and 8. The spring holder 58 is attached to the recharger unit 15 at a first position shown in FIG. 6 to accommodate a two-cell size battery stick 46, and is attached at a second position shown in FIG. 8 to accommodate a three-cell size battery stick 68. A first receiving bore 70 is located in the recharger unit to correctly position the spring holder for the two-cell battery stick, and a second receiving bore 72 is located to position the spring holder to receive a three-cell battery stick. The spring holder is positioned at either the first bore or the second bore by a positioning screw 74. In either case, changing from one position to the other is a simple process that only requires removing and retightening the positioning screw.

FIGS. 6-8 also show the manner in which the recharger unit 10 can be fastened to a wall. A wall bracket 76 can be attached to a flat surface, such as a wall, by screws 78 and 80 that are sunk into the wall. The recharger unit 15 in turn can be fastened to the wall bracket by holding screws 82 and 84. The holding screws provide a semi-permanent fixture of the recharger unit to the bracket and therefore to the wall. Alternatively, the recharger unit can be left on a table top or a desk, for example, to be moved about as desired. The battery recharger will recharge battery sticks as long as it is properly connected to a 12 volts dc, 110 volts ac, or 220 volts ac electrical source. Three cables (not illustrated) are provided for connection to each of these electrical sources.

The recharger system 10 can also accommodate two flashlights if desired. This is accomplished by attaching a second clamping structure to the recharger unit 15 at its side, at the clamping structure holes 26 and 28 as shown in FIG. 1. The two clamping structures are shown attached in FIG. 9, which is a view looking up at the two clamping structures from the bottom of the recharger unit. A first clamping structure 14 is shown attached to one side of the recharger unit 15, while an identical second clamping structure 76 is shown attached to the opposite side. Flashlights clamped to the recharger unit would be attached and detached by motion in the direction of the arrows 77. FIG. 9 shows that the clamping structures include a generally flat surface 80 at the top of the circular arm 22 to protect the lens of the flashlight from damage. The flat surface includes a central hole 82 that makes it simple to ensure that the flashlight is not inadvertently left on while clamped to the system 10.

Variations on attaching flashlights to the recharger system 10 can also be accommodated by the present invention. As shown in FIG. 10, if it should be desirable to have an angled clamping, such as where the surface to which the recharger is mounted provides insufficient clearance for convenient removal of the flashlight, an angled bracket 78 can be attached to the recharger unit 15. A clamping structure 14 can then be attached to the bracket. With such a structure, the flashlight is removed not by a lever action of the flashlight parallel to the mounting surface, as shown by the arrows 77 in FIG. 9, but by a motion outwardly away from the mounting surface at an angle, in the direction of the arrows 79 in FIG. 10. This can make it easier to remove the flashlight, for example, if the recharger unit 10 must be mounted to a wall close to a corner. Other mounting angles can be accommodated as needed.

The present invention provides a battery recharger unit that converts virtually any standard two-cell or three-cell flashlight to a rechargeable flashlight by containing rechargeable batteries within the recharger housing and recharging them completely. The recharger unit can fully recharge battery sticks with amp-hour ratings much higher than conventional D-cell batteries. The recharger unit can hold a standard cylindrical body flashlight in clamping engagement with sufficient force to allow the flashlight body to be used as a carrying handle, and holds the top end of the flashlight to allow the maximum amount of the flashlight body to remain free for use as a handle. This also allows the body to be used as a lever arm to remove the flashlight from the grasp of the recharger unit.

The present invention has been described above in terms of presently preferred embodiments so that an understanding of the present invention can be conveyed. There are, however, many configurations for battery rechargers not specifically described herein, but with which the present invention is applicable. The present invention should therefore not be seen as limited to the particular embodiments described herein, but rather, it should be understood that the present invention has wide applicability with respect to battery rechargers of a wide variety of configurations. Such alternate configurations can be achieved by those skilled in the art in view of the descriptions herein.

We claim:

1. A battery recharger system for use with a flashlight having a flared head and a generally cylindrical body, the recharger system comprising:
   a recharger unit having a housing that accepts batteries with a predetermined amp-hour rating for recharging;
   recharging means for delivering electrical energy to the batteries located in the recharger unit; and
   clamping means, removably attached to the recharger unit, for accepting one end of the flashlight and receiving and removably clamping the flashlight in a clamped position adjacent to the recharger housing.

2. A battery recharger system as defined in claim 1, wherein the clamping means clamps the flashlight with sufficient clamping force to support at least the weight of the recharging means and recharger unit when it is filled with batteries.

3. A battery recharger system as defined in claim 1, wherein the clamping means holds the flashlight body parallel and spaced away from the recharger unit.

4. A battery recharger system for use with a flashlight having a flared head and a generally cylindrical body, the recharger system comprising:
   a recharger unit having a housing that accepts batteries with a predetermined amp-hour rating for recharging;
   recharging means for delivering electrical energy to the batteries located in the recharger unit; and
   clamping means, removably attached to the recharger unit, for accepting one end of the flashlight and receiving and removably clamping the flashlight in a clamped position adjacent to the recharger housing; wherein the clamping means comprises a circular arm that accepts the head of the flashlight and that allows the head and body of the flashlight to pivot relative to the recharger unit, and further comprises open clamping arms that snap around the body of the flashlight where it meets the head and that hold it securely in the clamped position.

5. A battery recharger system for use with a flashlight having a flared head and a generally cylindrical body, the recharger system comprising:
   a recharger unit having a housing that accepts batteries with a predetermined amp-hour rating for recharging;
   recharging means for delivering electrical energy to the batteries located in the recharger unit; and
   clamping means, removably attached to the recharger unit, for accepting one end of the flashlight and receiving and removably clamping the flashlight in a clamped position adjacent to the recharger housing, wherein the recharger unit includes receiving means for accepting battery sticks of both two-cell and three-cell size.

6. A battery recharger system as defined in claim 5, wherein the receiving means comprises a coil spring that can be removably fixed in a first position to hold a two-cell battery stick in the recharger unit and that can be removably fixed in a second position to hold a three-cell battery stick in the recharger unit.

7. A battery recharger system as defined in claim 1, wherein the recharging means includes circuitry that can adequately recharge a battery rated at greater than 4 amp-hours.

8. A battery recharger as defined in claim 1, wherein the clamping means is removably located on the side of the recharger unit.

9. A battery recharger system for use with a flashlight having a flared head and a generally cylindrical body, the recharger system comprising:
   a recharger unit having a housing that accepts batteries with a predetermined amp-hour rating for recharging;
   recharging means for delivering electrical energy to the batteries located in the recharger unit; and
   clamping means, removably attached to the recharger unit, for accepting one end of the flashlight and receiving and removably clamping the flashlight in a clamped position adjacent to the recharger housing;
   further including second clamping means, attached to the recharger unit, for accepting one end of a second flashlight and pivotably containing it, and for receiving and removably clamping that end of the second flashlight in a position adjacent to the recharger unit.

10. A battery recharger for use with a flashlight having a head and a body, the recharger comprising:
   a housing having an exterior surface and that accepts batteries with a predetermined amp-hour rating to be recharged;
   recharging means for delivering electrical energy to the batteries located in the housing;
   a circular arm, attached to the housing surface, that accepts a first end of the flashlight and that allows the first end and body of the flashlight to pivot relative to the housing; and semi-circular bracket, attached to the housing surface, that snaps around the body of the flashlight and removably clamps the body of the flashlight in a position adjacent to the housing with a clamping force sufficient to support the weight of the recharging means and housing.

11. A battery recharger as defined in claim 10, wherein the housing includes receiving means for accepting two-cell and three-cell battery sticks.

12. A battery recharger as defined in claim 10, wherein the recharging means comprises a battery recharger circuit that can adequately recharge a battery rated at greater than 4 amp-hours.

13. A battery recharger as defined in claim 10, wherein the circular arm and semi-circular bracket are removably attached to the housing surface and can be attached to a separate surface.

14. A battery recharger for use with a flashlight having a head and a generally cylindrical body, the recharger comprising:

a housing that accepts batteries to be recharged;

clamping means for clamping one end of the flashlight and holding the flashlight adjacent to the housing and for exerting enough clamping force to support the weight of the housing when it contains the batteries, wherein the clamping means grasps the flashlight only where the flashlight head joins the body; and recharging means for delivering electrical energy to the batteries located in the housing.

15. A battery recharger system for use with a flashlight having a flared head and a generally cylindrical body, the battery recharger system comprising:

a housing that accepts batteries that have a predetermined amp-hour rating for recharging the batteries;

a recharging circuit disposed within the housing for delivering electrical energy to the batteries in the housing; and a clamp that is removably attached to the housing and that accepts one end of the flashlight to thereby receive and removably clamp the flashlight in a position adjacent to the housing.

* * * * *